Nov. 16, 1965      V. L. TAYLOR      3,218,542

ELECTRONIC CIRCUIT PROTECTOR

Filed June 25, 1962

INVENTOR.
Verl L. Taylor
BY Moody and Phillion
Attorneys

United States Patent Office 3,218,542
Patented Nov. 16, 1965

3,218,542
ELECTRONIC CIRCUIT PROTECTOR
Verl L. Taylor, Costa Mesa, Calif., assignor to Collins Radio Company, Cedar Rapids, Iowa, a corporation of Iowa
Filed June 25, 1962, Ser. No. 204,886
6 Claims. (Cl. 323—22)

This invention relates, generally, to circuit protectors and, more particularly, to a circuit protector which will protect against sudden transient conditions.

There are in the prior art many devices for protecting a circuit from overload conditions. Probably the most common means of protection known is the fuse. However, the fuse is a slow acting device at best. After each use a search usually must be conducted for a replacement. The magnetic circuit breaker eliminates the replacement problem and ordinarily is faster acting than a fuse but is still too slow to protect many electronic circuits from certain types of overload conditions. The most common types of overload conditions which can exist in a circuit can be divided generally into two general categories. One category includes overload conditions which exists for a relatively long period of time, for example, several milliseconds or longer. The other general type of overload condition is the sudden transient which may exist for, perhaps, only several tens of microseconds, or less. Almost all circuits can stand a much higher sudden transient overload condition than an overload condition that exists for a relatively long period of time since the quantity of energy involved is of considerable importance in determining the amount of overload any given circuit can withstand. Obviously, the amount of energy contained in a short transient pulse of a given amplitude is not nearly as great as the amount of energy contained in an oveload condition of, say, one-half the amplitude but which has a time duration of 100 times that of the transient pulse.

There have been developed electronic circuit protectors which will function to respond to transient conditions to remove the voltage supply from a circuit. However, such protecting circuits are relatively ineffective against overloads of lesser amplitude but of longer duration since such protective circuits are primarily amplitude responsive. A further characteristic of electronic circuit protectors is the relative complexity. Usually, the circuit protector is a separate circuit from the voltage regulation means.

An object of the present invention is a circuit protector which will not only function to protect a circuit from short duration transient conditions of a given amplitude but will also function to protect the circuit against lesser amplitude overload conditions which are of relatively longer duration.

A further object of this invention is a circuit protector which utilizes the existing voltage regulation circuitry as a part therof.

Further aims of the invention are to provide simplicity, inexpensiveness and reliability in a circuit protector means.

In accordance with the invention there is provided a conventional voltage regulator constructed to provide a regulated voltage supply from an unregulated D.C. voltage source. The voltage regulator comprises a sensing means for sensing the regulated voltage amplitude, and first variable impedance means connected across the voltage source and responsive to the voltage sensing means to have its impedance varied. A suitable first switching means, which can comprise a transistor, is connected in series between the voltage source and the output terminals and is constructed to be responsive to variations in said variable impedance to maintain the amplitude of the regulated voltage constant. In combinations with the above-mentioned conventional voltage regulator there is provided overload protector circuit which includes a sensing resistor connected in series with the output terminals of said voltage regulator and through which the output load current must flow.

A series circuit, including another switching means such as a silicon controlled rectifier (SCR) and a resistor, is connected across the sensing resistor and the said suitable first switching means with the cathode and the control electrode of the SCR being connected across the sensing resistor. Other means, such as a driver transistor, is constructed to respond to the change in voltage that occurs across the resistor in series with the SCR when said SCR fires in response to a transient condition, to cause the switching means to close (i.e., will not pass a current). Thus the unregulated power supply is disconnected from the load. In the absence of a transient overload, the SCR is normally nonconductive so that the first switching means remains opened.

The above-mentioned and other objects and features of the invention will be more fully understood from the following description thereof when read in conjunction with the drawing in which.

Figure 1:
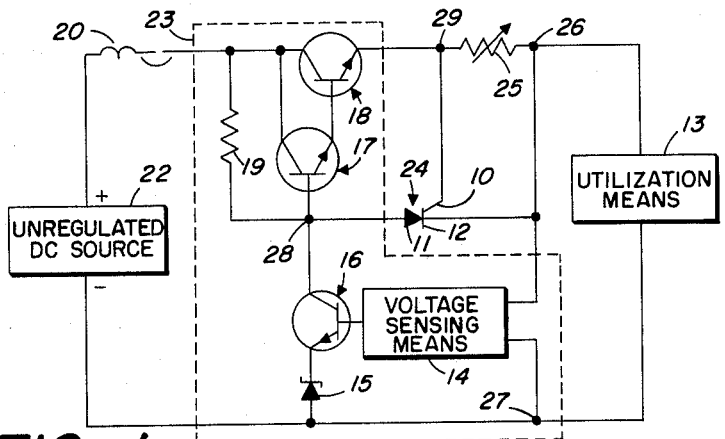
FIG. 1 shows a schematic diagram of one form of the invention.

Referring now to FIG. 1, the circuit shown therein may be divided roughly into four sections. The first section being the unregulated D.C. source 22, the second part being the circuit breaker 20, the third part being a conventional voltage regulator within the dotted line 23, and the fourth section consisting of silicon controlled rectifier 24 which functions as an electronic switch, variable resistor 25 and resistor 19. The block 13 represents the utilization load of the regulated output voltage.

As indicated above, the function of the circuit breaker 20 is to handle overloads of a given amplitude level which last over a relatively long period of time, of the order of several milliseconds, for example. The function of the inventive portion of the circuit, as discussed above, is to protect the output circuit from short duration transient of large amplitude which would not operate the circuit breaker due to their short duration.

Referring now to the voltage regulator within the dotted line 23, the transistor 18 is connected in series between the unregulated D.C. source 22 and the output load 13. The emitter-to-collector impedance of transistor 18 is controlled by means discussed hereinafter which is responsive to the voltage appearing across the load 13. Driver transistor 17 has its emitter connected to the base of transistor 18 and functions as a variable impedance in the base of the series transistor 18 to control the impedance of transistor 18. The emitter-to-collector impedance of the transistor 17 is, in turn, controlled by a voltage divider consisting of resistor 19, transistor 16, and zener diode 15 which are connected in series across the unregulated D.C. source 22 as can be seen in FIG. 1. The base of the driver transistor 17 is connected in the aforementioned voltage divider between the resistor 19 and the collector electrode of transistor 16.

In the aforementioned voltage divider the transistor 16 functions as a variable impedance which will change the potential supplied to the base electrode of driver transistor 17 which, in turn, will change the potential of the base of the series power transistor 18. More specifically, the emitter-to-collector electrode of transistor 16 is controlled by variations in the output voltage appearing across the output terminals 26 and 27. Such output voltage is sensed by voltage sensing circuit 14 and is supplied to the base of transistor 16 to change the conductivity thereof in accordance with the change of amplitude of the regulated output voltage.

As a specific example, assume that the regulated output voltage appearing at output terminals 26 and 27 increases. Thus, the potential of the base of transistor 16 will be increased and, since transistor 16 is an NPN type transistor, the conductivity thereof will be increased. The current through the transistor 16 and also through the resistor 19 will therefore be increased so that the potential at the junction 28 will become more negative. Since driver transistor is an NPN type transistor the impedance thereof will be increased and the potential of its emitter decreased. The potential of the emitter of transistor 17 will follow the potential of the base in the negative direction. Consequently, the conductivity of the series power transistor 18, which is an NPN type transistor, will be decreased thus causing a decrease in the current therethrough with a resulting decrease in potential across the output terminals 26 and 27.

Up to this point the circuitry that has been described is conventional in that the circuit breaker 20 and the voltage regulator 23 are conventional. There will now be described the novel circuit means comprising the silicon controlled rectifier 12 and the sensing resistor 25 and the co-operation of these two additional elements with the conventional voltage regulator 23 to provide circuit protection against large transients of short duration.

The silicon controlled rectifier (SCR) 24, which may be a type 2N1595 manufactured by the Solid State Products, Inc., company of Salem, Massachusetts, is comprised of an anode 11, a cathode 12, and a gating or firing electrode 10. The anode 11 is connected to the base of driver transistor 17, the cathode 12 is connected to the output terminal 26, and the firing electrode 10 is connected to the junction 29, which is the same electrical point as the emitter of transistor 18. Thus, the variable resistor 25 is connected across the cathode 12 firing electrode 10 gap so that the voltage across sensing resistor 25 will control the firing of the silicon controlled rectifier 24. It is to be understood that within what is considered a normal range of the regulated output voltage, the voltage appearing across the sensing resistor 25 will never become large enough to fire the silicon controlled rectifier 24. It is only when a large transient occurs that the voltage across the sensing resistor 25 becomes sufficiently large to fire the rectifier 12. Under the normal operating conditions when rectifier 12 is not fired there is a voltage drop thereacross of perhaps 1.5 volts, which is sufficiently large to maintain conductivity in both the driver transistor 17 and the series power transistor 18. It will be observed that this 1.5 volts exists across the junction 28 and the output terminal 26. When a large transient overload occurs, however, the voltage across the resistor 25 increases above the firing level of the SCR 24 so that the SCR 24 will fire, thus decreasing the voltage thereacross to about 0.8 volt, which is insufficient to maintain conductivity in the driver transistor 17 or the series power transistor 18. Thus both transistor 17 and transistor 18 will become nonconductive, thereby cutting off the unregulated D.C. voltage source 22 from the output terminal 26. It is to be noted that the potential of point 29 can never be less than that of point 26 so that if the potential across points 28 and 26 is insufficient to maintain conductivity in transistors 17 and 18, then the potential across points 28 and 29 must also be insufficient.

As soon as the series transistor 18 becomes nonconductive two things happen. Firstly, the current through the resistor 25 will drop to zero, thus causing the voltage thereacross to decrease to zero. Secondly, the potential across the output terminals 26 and 27 will go towards zero so that the transistor 16 will become nonconductive, thus raising the potential of point 28.

It is to be noted that the SCR 12 will not be cut off, however, until the circuit breaker 20 is opened. The reasons for the foregoing are as follows. For a silicon controlled rectifier to assume a nonconductive condition one of two things must occur. Either the current therethrough must be reduced to a few milliamperes or the anode-to-cathode potential must be reduced to a few tenths of a volt. In the particular circuit breaker described herein neither condition is likely to occur. Consequently, a resetting of the circuit breaker is the best method for cutting off the SCR and resetting the circuit.

With transistors 17 and 18 conductive again, a current will be re-established through the series power transistor 18, the sensing resistor 25, and the load 13. In most cases the transient condition will have disappeared by this time so that normal operation of the circuit will be resumed. However, in the event that the transient condition still exists, the sensing resistor will again detect the overload condition and again cause firing of SCR 12 so that the cycle will be repeated. Should the cycle be repeated several times, the accumulated energy will function to open the circuit breaker 20.

The function of the zener diode 15 is to maintain the potential of the emitter of transistor 16 at a constant voltage, thus providing a reference voltage to which the output voltage of the voltage sensing circuit 14, which is supplied to the base of transistor 16, can be compared.

Figure 2:
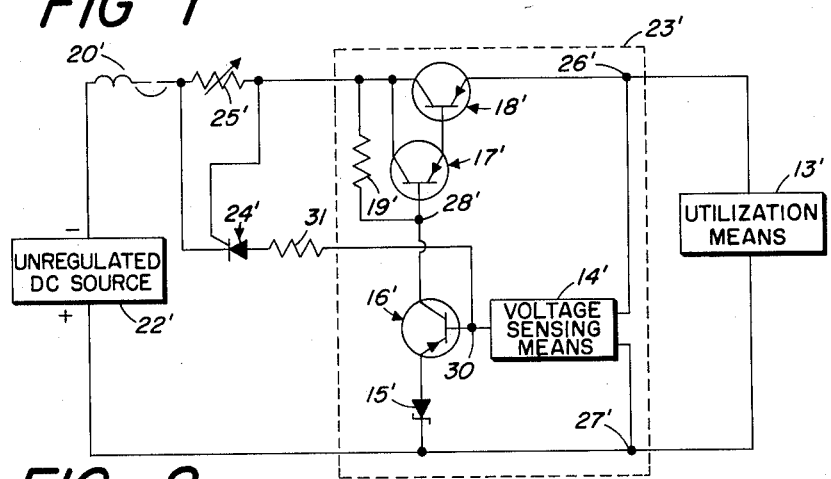
FIG. 2 shows a schematic diagram of another form of the invention.

Referring now to FIG. 2, there is shown a modification of the invention adapted to regulate a negative D.C. source wherein PNP type transistors are employed rather than NPN type transistors, as in the case of FIG. 1.

Briefly, the operation of the circuit of FIG. 2 is as follows. The conventional voltage regulator 23' of the circuit of FIG. 2 operates in much the same way as that of FIG. 1. More particularly, assume that an overload condition occurs such that the potential of the output termimal 26' increases in a negative direction. As a result thereof, the potential of the base of transistor 16' increases in a negative direction, thus increasing the conductivity of transistor 16' which, in turn, causes the potential of the junction 28 to increase positively. The transistors 17' and 18' will, therefore, become less conductive, thus decreasing the magnitude of the negative output voltage across terminals 26' and 27'.

Assume now that a large transient occurs in the circuit so that the current through the sensing resistor 25' increases. Under normal operating conditions the SCR 24' will be nonconductive since the potential across the sensing resistor 25' is insufficient to fire the SCR 24'. However, when the large transient condition occurs, the voltage drop across the sensing resistor 25' increases sufficiently to fire the SCR 24', thus lowering the potential of the point 30 to cause thoe transistor 16' to become more conductive, and thus increasing the collector potential thereof in a positive direction. Consequently, the said transistors 17' and 18' will become nonconductive reducing the output voltage across output terminals 26' and 27' to zero. To reset the circuit the circuit breaker 20' should be opened which will cut off the SCR 24'. When the circuit breaker is closed again the circuit will be operative. Resistor 31 is a current-limiting resistor.

Figure 3:
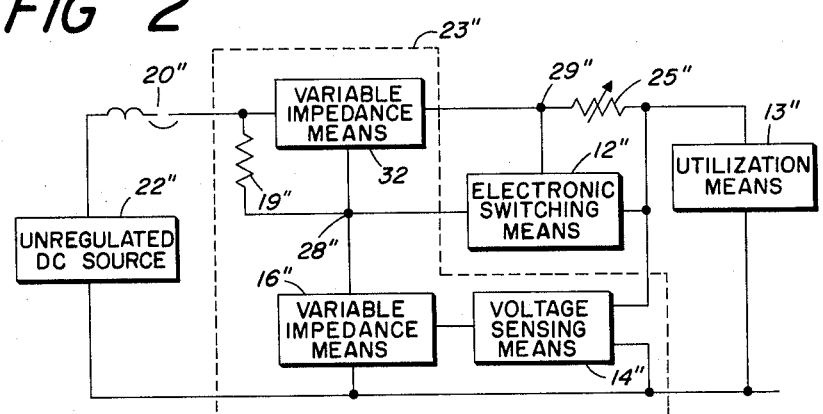
FIG. 3 shows a generalized block diagram of the invention.

Referring now to FIG. 3, there is shown a block diagram of the invention which more clearly illustrates in a general manner the function of the various parts thereof. The variable impedances 16" and 32 correspond to the transistor 16 and the transistor 18 of FIG. 1, for example. The transistor 17 of FIG. 1 has no direct counterpart in the structure of FIG. 3 inasmuch as its function is that of a driver stage. The purpose of the structure of FIG. 3 is to illustrate that the type of variable impedance employed in the blocks 16" and 32 are not restricted to transistors, but can be any suitable variable impedance means such as vacuum tubes or other types of semiconductor devices.

Similarly, the switching means 12″ of FIG. 3, which is shown specifically as a silicon controlled rectifier in FIGS. 1 and 2, is not limited to a silicon controlled rectifier, but may be any type of device which has the characteristics suitable for this invention. More specifically, such a variable impedance device may be any device which has operating characteristics similar to those of a silicon controlled rectifier.

It is to be understood that the forms of the invention shown and described herein are but preferred embodiments thereof, and that various changes may be made in the circuit arrangement and in the type components employed without departing from the spirit or the scope of the invention.

I claim:

1. In combination with a voltage regulator circuit for providing a regulated output voltage supply at the output terminals thereof from an unregulated voltage source, comprising voltage sensing means constructed to produce an output signal representative of variations in the amplitude of the regulated voltage supply, voltage divider means connected across said unregulated voltage source and comprising a tap thereon and a first variable impedance having a control electrode responsive to the output signal of said voltage sensing means to vary its impedance, and second variable impedance connected in series with said unregulated voltage source, said second variable impedance having a first terminal and a second control electrode connected to said tap on said voltage divider and constructed to respond to changes in the potential thereof with respect to the potential of said first terminal to have its impedance varied, circuit protector means comprising sensing impedance means connected in series with said unregulated voltage source, said second variable impedance and said regulated output voltage supply with one terminal of said sensing impedance means being common with said first terminal, electronic switching means having a third control electrode means, cathode means and anode means, the said electronic switching means having its control electrode-cathode terminals connected directly across said sensing impedance means in such a polarity as to cause closing of said electronic switching means when a transient current of sufficient amplitude flows through said sensing impedance means, the said anode of said electronic switching means being connected to the second control electrode of said second variable inpedance to cause the said second variable impedance to become nonconductive when said electronic switching means is closed, thus cutting off the flow of current from said unregulated D.C. source to said regulated output voltage supply.

2. A circuit protector in accordance with claim 1 comprising a circuit breaker connected in series with said unregulated voltage source and said second variable impedance means.

3. A circuit protector means in accordance with claim 1 in which said first variable impedance means and said second variable impedance means comprise an NPN type transistor and in which said electronic switching means comprises a silicon controlled rectifier having its anode connected to said coltage divider tap.

4. A circuit protector means in accordance with claim 1 in which said first and second variable impedances are PNP type transistors and in which said electronic switching means is a silicon controlled rectifier, and comprising means for connecting the anode of said electronic switching means to the output of said voltage sensing means.

5. In combination with a voltage regulator for providing a regulated voltage supply at output terminals thereof from an unregulated voltage supply comprising first variable impedance means having a first terminal and first control electrode means, said first variable impedance means being connected in series arrangement with said unregulated voltage supply and constructed to have its impedance determined by the voltage supplied across said first terminal and said control electrode, circuit protector means comprising sensing impedance means having a terminal in common with said first terminal and being in series with said first variable impedance means and said unregulated voltage supply and electronic switching means having cathode means, anode means, and second control electrode means, means for connecting said anode to the control electrode means of said first variable impedance means, the said second control electrode being connected to the said terminal of said sensing impedance means, and said cathode means being connected to the other terminal of said sensing impedance.

6. A circuit protector means in accordance with claim 5 in which said first variable impedance means comprises an NPN type transistor and in which said electronic switching means comprises a silicon controlled rectifier with its anode connected to the control electrode of said first variable impedance means.

References Cited by the Examiner

UNITED STATES PATENTS 3,109,980   11/1963   Wiley _____ 317—22

MILTON O. HIRSHFIELD, *Primary Examiner.*

LLOYD McCOLLUM, *Examiner.*